United States Patent [19]

Arai

[11] Patent Number: 5,070,571
[45] Date of Patent: Dec. 10, 1991

[54] WINDSHIELD WIPER

[75] Inventor: Masaru Arai, Yono, Japan

[73] Assignee: Nippon Wiperblade Co., Ltd., Saitama, Japan

[21] Appl. No.: 587,564

[22] Filed: Sep. 24, 1990

Related U.S. Application Data

[63] Continuation-in-part of Ser. No. 327,117, Mar. 22, 1989, abandoned.

[30] Foreign Application Priority Data

Mar. 24, 1988 [JP] Japan .................. 63-68059

[51] Int. Cl.$^5$ ................................ B60S 1/04
[52] U.S. Cl. ................. 15/250 R; 15/250.35; 15/250.42; 188/378
[58] Field of Search ........... 15/250 R, 250 C, 250.01, 15/250.02, 250.04, 250.20, 250.21, 250.23, 250.30, 250.35, 250.41, 250.42; 188/378, 380, 381

[56] References Cited

U.S. PATENT DOCUMENTS

| 2,644,187 | 7/1953 | Lacy | 15/250.35 |
|---|---|---|---|
| 3,171,683 | 3/1965 | Ludwig | 15/250 R |
| 3,378,875 | 4/1968 | Kern | 15/250.04 |
| 4,361,927 | 12/1982 | Matsui et al. | 15/250 R |
| 4,768,256 | 9/1988 | Motoda | 15/250 R |
| 4,833,373 | 5/1989 | Doi et al. | 15/250 R |

FOREIGN PATENT DOCUMENTS

| 205236 | 1/1957 | Australia | 15/250.30 |
|---|---|---|---|
| 1628790 | 2/1971 | Fed. Rep. of Germany | 15/250.41 |
| 2122678 | 11/1972 | Fed. Rep. of Germany | 15/250.42 |
| 1412224 | 8/1965 | France | 15/250 R |
| 55-1116 | 1/1980 | Japan . | |
| 55-16876 | 2/1980 | Japan . | |
| 55-21026 | 2/1980 | Japan . | |
| 55-39175 | 3/1980 | Japan . | |
| 55-76071 | 5/1980 | Japan . | |
| 55-80078 | 6/1980 | Japan . | |
| 55-84179 | 6/1980 | Japan . | |
| 55-126980 | 9/1980 | Japan . | |
| 55-133272 | 9/1980 | Japan . | |
| 55-144575 | 10/1980 | Japan . | |
| 145046 | 11/1980 | Japan | 15/250 R |
| 56-28776 | 3/1981 | Japan . | |
| 56-54978 | 5/1981 | Japan . | |
| 56-37873 | 9/1981 | Japan . | |
| 56-154878 | 11/1981 | Japan . | |
| 70754 | 5/1982 | Japan | 15/250 R |
| 57-26828 | 6/1982 | Japan . | |
| 95238 | 6/1982 | Japan | 15/250.42 |
| 57-115680 | 7/1982 | Japan . | |
| 57-181379 | 11/1982 | Japan . | |
| 64563 | 4/1986 | Japan | 15/250.20 |

Primary Examiner—Philip R. Coe
Assistant Examiner—Mark Spisich
Attorney, Agent, or Firm—Wenderoth, Lind & Ponack

[57] ABSTRACT

A wiper device having an oscillator for applying high frequency small amplitude vibration which is actuated in response to the motion of the wiper device. The movement of the wiperblade is forcibly added to the high frequency repetitions of stick and slip conditions, thus, the chattering phenomenon of the wiperblade is suppressed, and the striped pattern on the windshield is prevented.

10 Claims, 5 Drawing Sheets

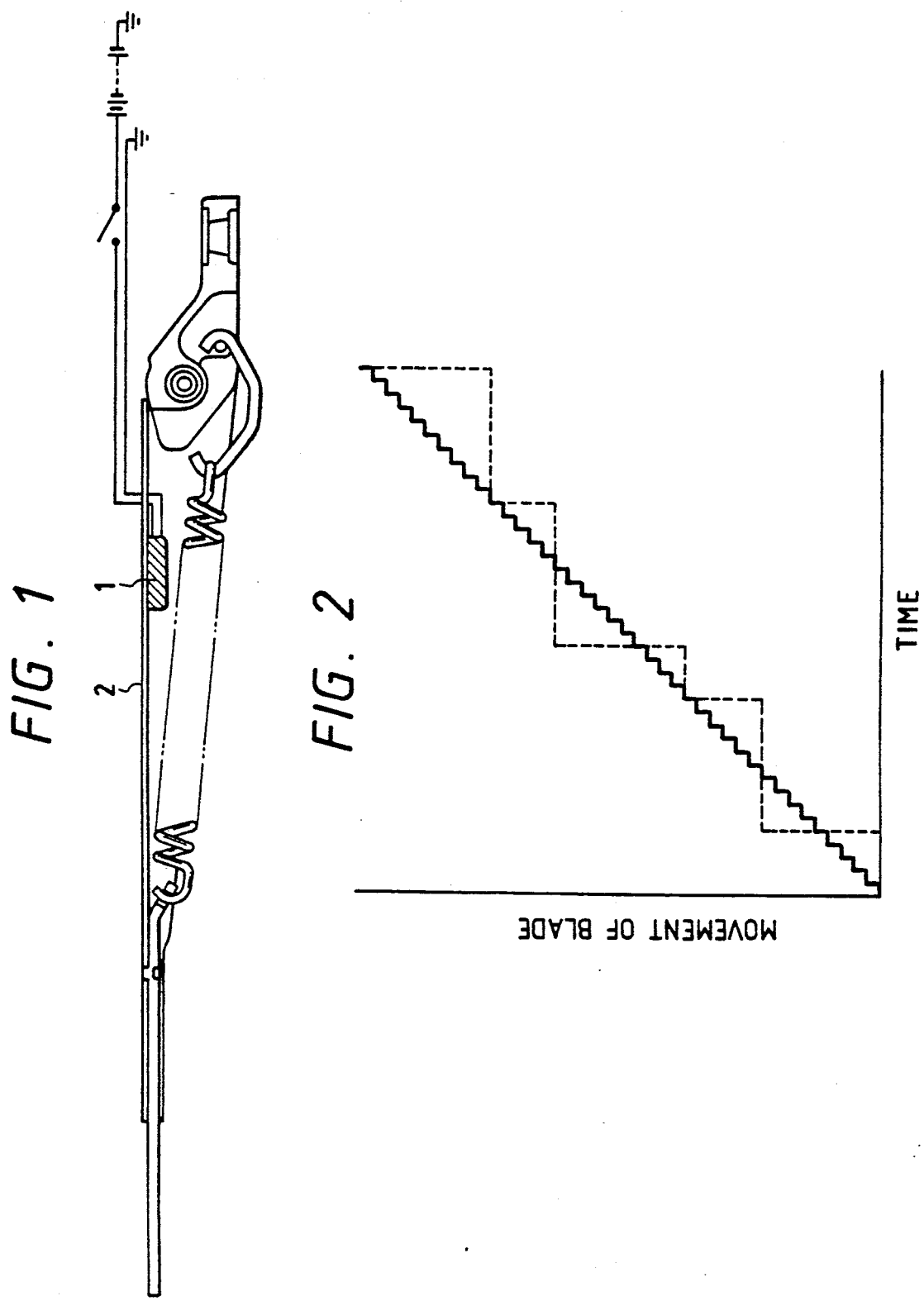

WINDSHIELD WIPER

This application is a continuation-in-part of now abandoned application, Ser. No. 07/327,117 filed on Mar. 22, 1989.

FIELD OF THE INVENTION

This invention relates to a windshield wiper for use in a vehicle such as an automobile and, particularly, to a windshield wiper which does not suffer from the so called chattering phenomenon of the wiper.

DESCRIPTION OF PRIOR ART

It has been recognized that the chattering phenomenon of the windshield wiper is generally caused by the vibration of the wiperblade in the sidewise directions, whereby a generally striped pattern is formed on the surface of the windshield. Therefore, the phenomenon should be prevented for improving the wiping characteristics.

For absorbing the energy of vibration various countermeasures have been proposed which include a wiper having a dead weight on the tip end of the wiperblade so as to increase the inertial force of the wiperblade, a wiper having a movable dead weight on the tip end of the wiperblade and a wiper having a resilient member on the shaft portion or on the wiper arm.

The aim of such prior art devices is to scatter or absorb the vibration energy, but not to reduce the energy itself. Thus, they may be effective for a specific amount of the energy or for a specific frequency of the vibration, but they are not effective in the case when the amount of the vibration energy is variable.

Further, there are deficiencies in the prior art devices in that the weight of the wiper device increases, the load for driving the wiper device increases and that the durability of the wiper device deteriorates.

Further, the wax coated on the outer surface of the vehicle may sometimes flow onto the surface of the windshield which substantially causes the change of the frictional force, thereby the chattering of the wiperblade is induced and the striped pattern is formed on the surface of the windshield. The prior art devices aforementioned are not effective to prevent such phenomena.

The present invention has been made with respect to the circumstances aforementioned, and an object of the invention is to provide a wiper device for suppressing the chattering phenomenon of the wiperblade thereby preventing the striped pattern on the windshield.

SUMMARY OF THE INVENTION

According to the invention, there is provided a wiper device having a vibration generating mechanism being actuated in response to the motion of the wiper device.

The vibration generating mechanism may be mounted at any desirable point on the wiper device, e.g. on the wiper arm, the wiperblade, or the shaft portion of the wiper device.

The vibration generating mechanism may be selected from among a ceramic piezoelectric element, an electric motor equipped with an eccentric rotor, a sonic element and a crystal element.

The vibration generating mechanism on the wiperblade acts to generate the repetitions of minute chattering vibrations, which can prevent completely any visible chattering phenomenon and the striped pattern on the windshield.

BRIEF DESCRIPTION OF THE DRAWINGS

Further objects and effects of the present invention will become apparent from the following detailed description in conjunction with the drawings, in which:

FIG. 1 is a schematic diagram of a wiper device according to the present invention;

FIG. 2 is a graph showing the movement of a wiperblade according to the present invention;

DETAILED DESCRIPTION OF PREFERRED EMBODIMENTS

Figure 1A:
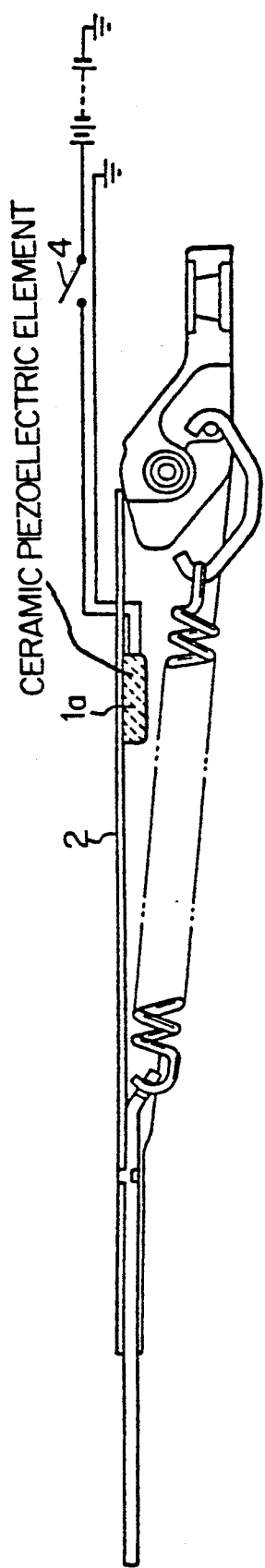
FIGS. 1A-1D are schematic diagrams similar to FIG. 1 but showing the wiper device having a ceramic piezoelectric element, an electric motor with an eccentric rotor, a sonic element, and a crystal element, respectively.
Figure 1B:
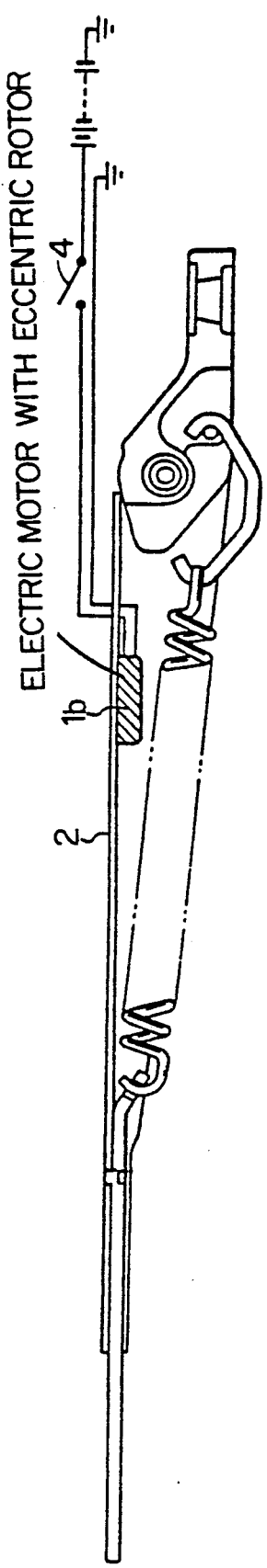
Figure 1C:
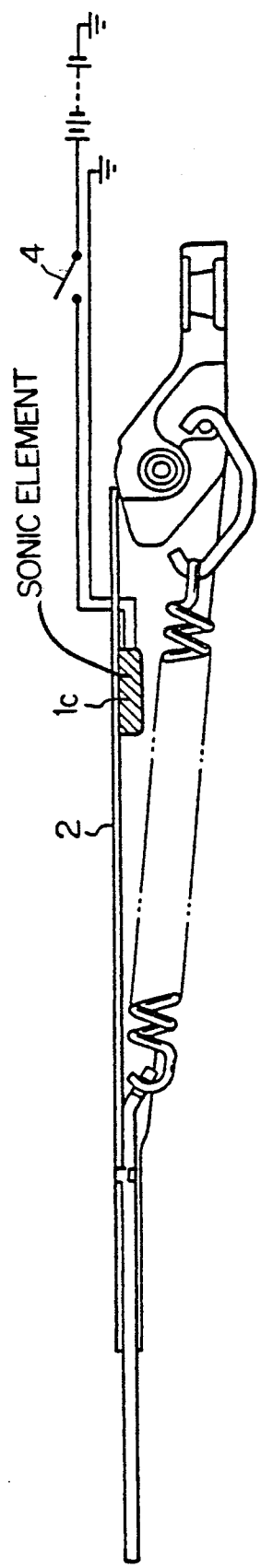
Figure 1D:
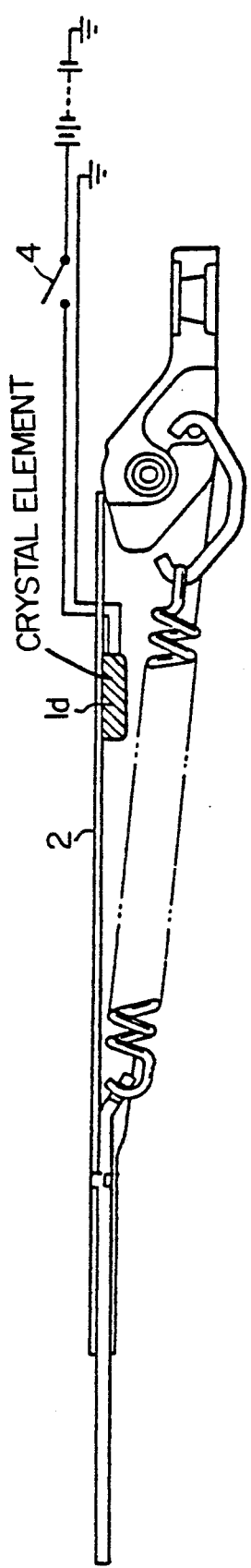

In analyzing microscopically, the movement of the wiperblade includes repeated periods of sticking and slipping as it reciprocates about a pivot axis thereof. When the intervals between the repeated periods of sticking and slipping are increased, is recognized as the so called chattering phenomenon. This chattering phenomenon sometimes results in a striped pattern being formed on the windshield.

FIG. 2 is a graph showing the relation between the time and the distance of the movement of the wiperblade, particularly, at a portion of a blade rubber contacting the windshield being wiped by the wiperblade. The continuous line in FIG. 2 shows the condition when the wiperblade smoothly wipes, and the broken line shows the condition when the severe chattering phenomenon is observed. The horizontal lines of each step show the stick condition where the blade rubber does not move relatively to the windshield, and the vertical lines show the slip condition where the blade rubber moves instantaneously within a limited distance.

The stick condition and the slip condition are caused by the composite function of the frictional force between the blade rubber and the glass and the resilient force of the blade rubber. When the frictional force increases, the blade rubber is excessively pulled on the glass surface and the strain energy is stored in the blade rubber. Then, the resilient force acts to release the strain energy and the frictional force decreases such that the blade rubber slips too much (the slip condition). Immediately thereafter, the slip movement of the blade rubber stops momentarily (the stick condition). The repetitions of the slip and stick conditions are observed as the chattering phenomenon. The chattering phenomenon is augmented by the wax, the dirt or dust on the surface of the windshield and cause an irregular and large amplitude vibration.

Thus, it is possible to suppress or prevent the chattering phenomenon by positively releasing the stick condition or decreasing the duration of the stick condition. The present invention is to apply high frequency vibration positively on the wiper device thereby forming high frequency repetitions of the stick condition and the slip condition, which suppresses the chattering phenomenon and prevents the striped pattern on the windshield.

According to the invention, a vibration generating mechanism 1 is provided and can be actuated in any suitable manner, including in response to detection by a sensor of a decrease in the speed of the wiper device or an increase in the electrical current of the wiper motor due to an increased load. Either of these conditions would provide an indication of the occurrence of the chattering phenomenon. Preferably, however, the vibration generating mechanism will be actuated by way of a manual switch 4 since the chattering phenomenon can be readily viewed by an operator of the vehicle device. If the vibration generating mechanism is actuated during the stationary condition of the wiper device, the blade rubber will excessively be worn and the service life of the wiper device will be deteriorated.

Figure 3:
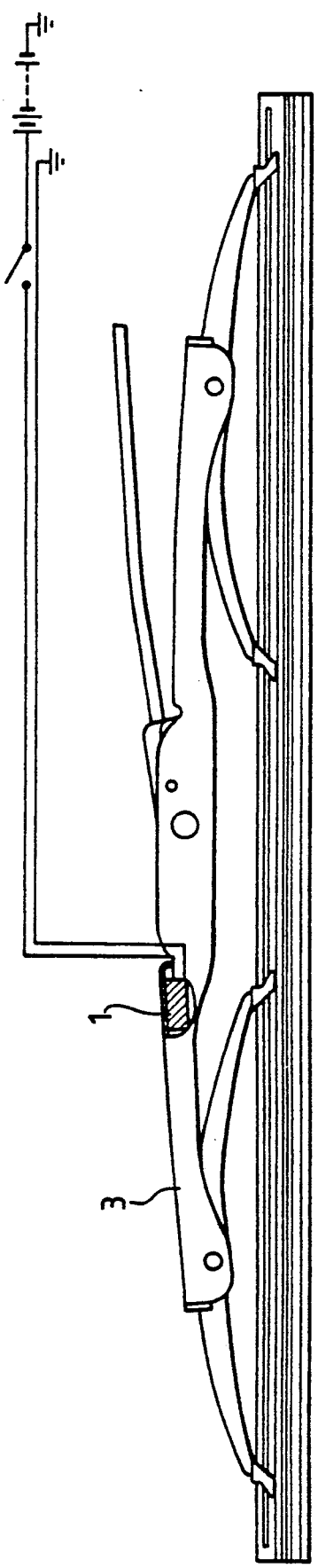
FIG. 3 is a schematic diagram of a wiper device according to another embodiment of the present invention.

The vibration generating mechanism may be mounted on any of the wiper arm, the wiperblade and the shaft portion of the wiper device. FIG. 1 shows a preferred embodiment, in which vibration generating mechanism 1 is mounted on a wiper arm 2. FIG. 3 shows another embodiment, in which the vibration generating mechanism 1 is mounted on a wiperblade 3. An electric source for driving the vibration generating mechanism, a switch, and wire connecting between the electric source and the vibration generating mechanism 1 are shown schematically in FIGS. 1 and 3.

Figure 5:
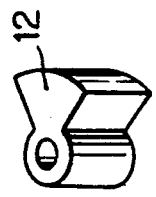
FIG. 5 is a perspective view of an eccentric rotor weight shown in FIG. 4.
Figure 4:
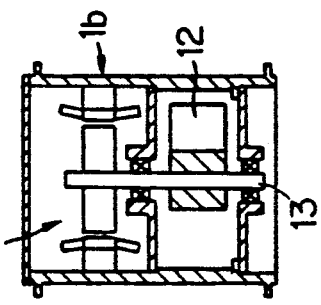
FIG. 4 is a cross-sectional elevation view of a prior art vibration generating mechanism defined by an electric motor with an eccentric rotor.

As shown in FIGS. 1A-1D, the vibration generating mechanism 1 may be selected from amoung a ceramic piezoelectric element 1A, an electric motor 1B equipped with an eccentric rotor, a sonic element 1C and a crystal element 1D. The vibration generating mechanism is preferably driven electrically an example of a particular prior art vibration generating mechanism which is defined by an electric motor having an eccentric rotor is shown in FIGS. 4 and 5. This device 1b has an outer casing within which is mounted an electric motor 11, an output shaft 13 and an unbalanced weight 12.

The frequency of vibration should be sufficiently high so that the repetitions of the stick condition and the slip condition cannot be observed visually, and the amplitude of vibration should be sufficiently small so as to not reduce the driving power of the wiper device That is, the vibrations should be at a high frequency relative to the reciprocating frequency of the windshield wiper.

Figure 1E:
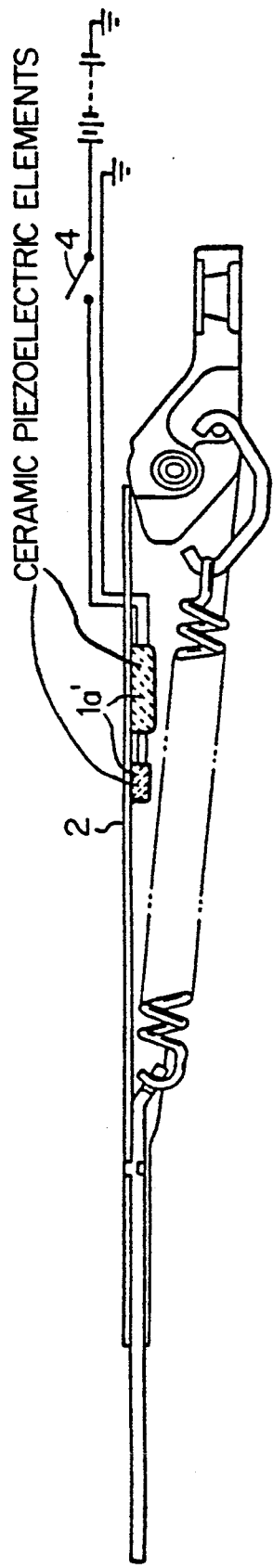
FIG. 1E is a schematic diagram similar to FIGS. 1 and 1A-1D, but showing the wiper device having two mutually perpendicularly mounted piezoelectric elements to provide both parallel and normal vibrations relative to a windshield.

When the direction of the vibration is parallel to the reciprocating movement of the wiperblade, the vibration adds or subtracts from the reciprocating movement to help eliminate the slip condition, and when the direction of the vibration is normal to the surface of the windshield, the vibration acts periodically to increase or decrease the force pressing the wiperblade against the surface of the windshield whereby the wiperblade is easily released from the stick condition FIG. 1E shows a wiper device having a pair of vibration generating piezoelectric elements 1a' mounted thereto in mutually perpendicular directions so as to provide a first vibration in a direction parallel to the windshield and a second vibration in a direction normal to the windshield. The piezoelectric elements 1a' are shown as being electrically connected in series but can also be connected in any other suitable manner, including a connection wherein the two elements can be actuated individually.

Also, any of the previously mentioned types of vibration generating mechanisms can be utilized in this manner to provide vibrations in both parallel and normal directions relative to the windshield. Additionally, the vibration generating mechanisms can be mounted in other differing directions so as to provide vibrations in any plane relative to the windshield.

According to the invention, the wiper device is forcibly vibrated so as to sufficiently increase the frequency of the repetitions of stick and slip conditions so that the chattering phenomenon of the wiperblade and the striped pattern on the surface of the windshield can effectively be avoided.

Scope of claim is:

1. An apparatus comprising:
    a windshield wiper having a wiper arm and a wiper blade and being adapted to reciprocate along an automobile windshield at a frequency;
    connecting means for connecting said windshield wiper to an automobile for pivotal movement relative thereto;
    a vibration generating mechanism mounted on said windshield wiper; and
    means for actuating said vibration generating mechanism to vibrate at a high frequency relative to the frequency at which said windshield wiper is adapted to reciprocate and to directly transmit the vibration of said vibration generating mechanism to said windshield wiper; and
    whereby chattering of said windshield wiper is prevented when said vibration generating mechanism is actuated by said actuating means.

2. A chatter prevention mechanism as recited in claim 1, wherein
    said vibration generating mechanism comprises a ceramic piezoelectric element.

3. A chatter prevention mechanism as recited in claim 1, wherein
    said vibration generating mechanism comprises an electric motor having an eccentric rotor.

4. A chatter prevention mechanism as recited in claim 1, wherein
    said vibration generating mechanism comprises a sonic element.

5. A chatter prevention mechanism as recited in claim 1, wherein
    said vibration generating mechanism comprises a crystal element.

6. A chatter prevention mechanism as recited in claim 1, wherein
    said actuating means actuates said vibration generating mechanism to vibrate in a direction parallel to the direction of reciprocating movement of the windshield wiper.

7. A chatter prevention mechanism as recited in claim 1, wherein
    said actuating means actuates said vibration generating mechanism to vibrate in a direction normal to the surface of the windshield.

8. A chatter prevention mechanism as recited in claim 1, wherein
    said actuating means comprises a manual switch.

9. A chatter prevention mechanism as recited in claim 1, wherein
    said windshield wiper has a pivot axis about which it is adapted to reciprocate.

10. A chatter prevention mechanism as recited in claim 1, wherein
    said vibration generating mechanism is mounted on said wiper arm of said windshield wiper.

* * * * *